US012584558B2

(12) United States Patent
Mastbergen

(10) Patent No.: US 12,584,558 B2
(45) Date of Patent: Mar. 24, 2026

(54) HYBRID BUTTERFLY-BALL FLOW CONTROL VALVE

(71) Applicant: Woodward, Inc., Fort Collins, CO (US)

(72) Inventor: Daniel B. Mastbergen, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 209 days.

(21) Appl. No.: 18/365,001

(22) Filed: Aug. 3, 2023

(65) Prior Publication Data

US 2025/0043868 A1 Feb. 6, 2025

(51) Int. Cl.
*F16K 1/22* (2006.01)
*F16K 1/54* (2006.01)

(52) U.S. Cl.
CPC ................ *F16K 1/222* (2013.01); *F16K 1/54* (2013.01)

(58) Field of Classification Search
CPC .................................... F16K 1/222; F16K 1/54
See application file for complete search history.

(56) References Cited

U.S. PATENT DOCUMENTS

| | | | | |
|---|---|---|---|---|
| 965,322 | A | 7/1910 | Peterson | |
| 2,058,996 | A * | 10/1936 | Kollberg | F16K 1/226 251/306 |
| 2,273,118 | A * | 2/1942 | Langdon | F16K 15/03 137/527.8 |
| 3,298,677 | A | 1/1967 | Anderson | |

| | | | | |
|---|---|---|---|---|
| 3,677,297 | A | 7/1972 | Walton | |
| 3,770,242 | A * | 11/1973 | O'Connor, Jr. | F16K 1/222 251/305 |
| 3,974,860 | A * | 8/1976 | Stead | F16K 1/222 137/625.3 |
| 4,194,722 | A * | 3/1980 | Okerblom | F16K 1/222 251/305 |
| 4,572,478 | A * | 2/1986 | Vogler | F02D 9/104 137/513.5 |
| 6,722,137 | B2 * | 4/2004 | Proctor | F16K 1/222 60/785 |
| 7,185,878 | B2 * | 3/2007 | Alves | F16K 27/0218 251/305 |
| 7,406,823 | B2 * | 8/2008 | Takahashi | F01N 3/106 123/337 |

(Continued)

OTHER PUBLICATIONS

International Search Report; European Patent Office; International Patent Application No. PCT/US2024/040923; Oct. 31, 2024; 4 pages.

(Continued)

*Primary Examiner* — Umashankar Venkatesan
(74) *Attorney, Agent, or Firm* — Taft Stettinius & Hollister LLP

(57) ABSTRACT

The subject matter of this specification can be embodied in, among other things, a flow control valve that includes a gate element formed as a spherical segment having a semispherical peripheral edge, a substantially planar face bounded by a substantially elliptical edge at the semispherical peripheral edge, and a channel defined in the substantially planar face and having a first end proximal to a midpoint of the substantially planar face and extends from the first end to a second end defining a notch in the semispherical peripheral edge.

19 Claims, 9 Drawing Sheets

(56)          References Cited

U.S. PATENT DOCUMENTS

| 10,746,322 | B2 * | 8/2020 | Fages | ....................... | F16K 47/04 |
|---|---|---|---|---|---|
| 2012/0217426 | A1 * | 8/2012 | Berthelsen | .............. | F16K 5/204 |
| | | | | | 251/315.01 |
| 2018/0335149 | A1 * | 11/2018 | Trudel | ................. | F16K 1/2268 |
| 2024/0018913 | A1 * | 1/2024 | Rymann | ................... | F16K 1/54 |

OTHER PUBLICATIONS

Written Opinion of the International Searching Authority; European
Patent Office; International Patent Application No. PCT/US2024/
040923; Oct. 31, 2024; 11 pages.

* cited by examiner

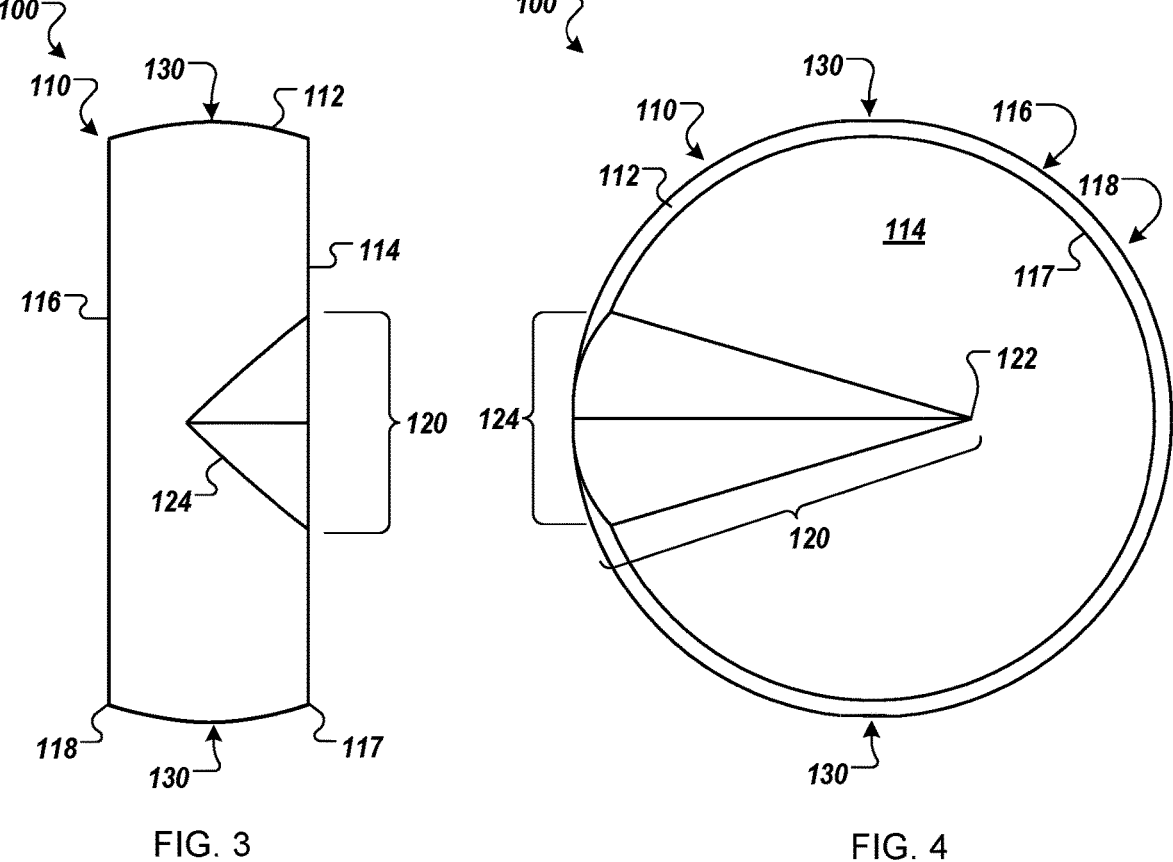
FIG. 3                        FIG. 4

700
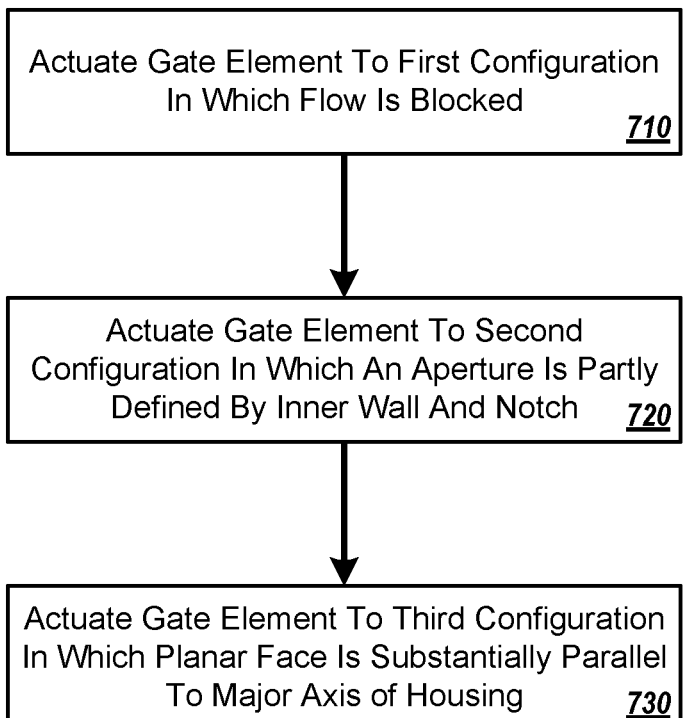
Actuate Gate Element To First Configuration
In Which Flow Is Blocked
_710_
Actuate Gate Element To Second
Configuration In Which An Aperture Is Partly
Defined By Inner Wall And Notch    _720_
Actuate Gate Element To Third Configuration
In Which Planar Face Is Substantially Parallel
To Major Axis of Housing    _730_
FIG. 7

HYBRID BUTTERFLY-BALL FLOW CONTROL VALVE

TECHNICAL FIELD

This instant specification relates to flow control valves, more specifically butterfly type flow control valves and ball type flow control valves.

BACKGROUND

Fuel mass flow control valves for engines can require high flow ranges from minimum to maximum flow (turn down ratio) and require precise fuel metering accuracy. Previous flow control valve solutions that attempt to achieve both large turn down ratios and high accuracies have typically implemented complex valve design approaches.

SUMMARY

In general, this document describes flow control valves that implement hybrids of butterfly type valve designs and ball type valve designs.

In a general example, a flow control valve includes a gate element formed as a spherical segment having a semispherical peripheral edge, a substantially planar face bounded by a substantially elliptical edge at the semispherical peripheral edge, and a channel defined in the substantially planar face and having a first end proximal to a midpoint of the substantially planar face and extends from the first end to a second end defining a notch in the semispherical peripheral edge.

Various embodiments can include some, all, or none of the following features. The flow control valve can include a housing having an inner wall having a first diameter that is substantially equal to a second diameter of the semispherical peripheral edge. The gate element can be configured to rotate within a housing to a partly blocking configuration in which a circumference of the semispherical peripheral edge is proximal to the inner wall. The gate element can be configured to rotate within the housing to a blocking configuration in which a circumference of the semispherical peripheral edge is proximal to the inner wall and is intersected by a portion of the notch. The gate element can be configured to rotate within a housing to a flowing configuration in which the substantially planar face is arranged substantially parallel to a fluid flow path defined by the housing. The housing can be a cylindrical and defines a major axis, and the gate element is configured to rotate within a housing to a flowing configuration in which the substantially planar face is arranged substantially parallel to the major axis. The channel can have substantially zero depth away from the substantially planar face into the spherical segment at the first end and has a depth that progressively increases as the channel extends from the first end to a second end. The channel can be substantially triangular and substantially v-shaped or u-shaped. The flow control valve can include a post arranged between the gate element and a housing and configured to guide pivotable movement of the gate within the housing. The post can be configured to urge pivotable movement of the gate element.

In another general example, a method of flow control includes actuating a gate element of a flow control valve to a first configuration in which fluid flow is substantially blocked by the gate element, wherein the flow control valve further includes a cylindrical housing having an inner wall having a first diameter, and the gate element is formed as a spherical segment having a semispherical peripheral edge having a second diameter that is substantially equal to the first diameter, a substantially planar face bounded by a substantially elliptical edge at the semispherical peripheral edge, and a channel defined in the substantially planar face and having a first end proximal to the substantially planar face away from the substantially elliptical edge and extending away from the substantially planar face and partly into the spherical segment to a second end defining a notch in the semispherical peripheral edge, actuating the gate element to a second configuration in which an aperture is partly defined by the inner wall and the notch, actuating the gate element to a third configuration in which the substantially planar face is substantially parallel to a major axis of the cylindrical housing.

Various implementations can include some, all, or none of the following features. In the second configuration the gate element can be rotated within the housing such that a circumference of the semispherical peripheral edge is proximal to the inner wall and is intersected by a portion of the notch. In the second configuration the gate element can be rotated within the housing such that the substantially planar face is arranged substantially perpendicular to a fluid flow path defined by the housing. In the first configuration the gate element can be rotated within the housing such that a circumference of the semispherical peripheral edge is proximal to the inner wall. The channel can have substantially zero depth away from the substantially planar face into the spherical segment at the first end and can have a depth that progressively increases as the channel extends from the first end to a second end. The channel can be substantially triangular and substantially v-shaped or u-shaped. The gate element can include a post arranged between the gate element and the housing and configured to guide pivotable movement of the gate within the housing. The post can be configured to urge pivotable movement of the gate element.

In another general example, a valve apparatus includes a gate element formed as a spherical segment configured to rotate within a housing, and a channel defined in a substantially planar face of the gate element.

The systems and techniques described here may provide one or more of the following advantages. First, a system can provide fluid control with high ranges of flow. Second, the system can provide precise fluid metering accuracy. Third, the system can provide fluid control with a high turndown ratio. Fourth, the system can provide these advantages in a mechanical form that is relatively less expensive than previous solutions having similar features. Fifth, the system can provide a solution with very low leakage.

The details of one or more implementations are set forth in the accompanying drawings and the description below. Other features and advantages will be apparent from the description and drawings, and from the claims.

DESCRIPTION OF DRAWINGS

FIG. 3 is a side view of the example gate element of FIG. 1.

FIG. 4 is a front view of the example gate element of FIG. 1.

FIG. 7 is a flow chart that shows an example of a process for controlling flow.

DETAILED DESCRIPTION

This document describes flow control valves that implement hybrids of butterfly type valve designs and ball type valve designs. In general, the valves described herein can resemble ball valves in which the ball gate has its leading and trailing edges cut off into flat faces, or can resemble butterfly valves with unusually thick central disc gates. A channel is cut into the upstream face, which in some implementations can improve flow control at near-closed configurations.

Figure 1:
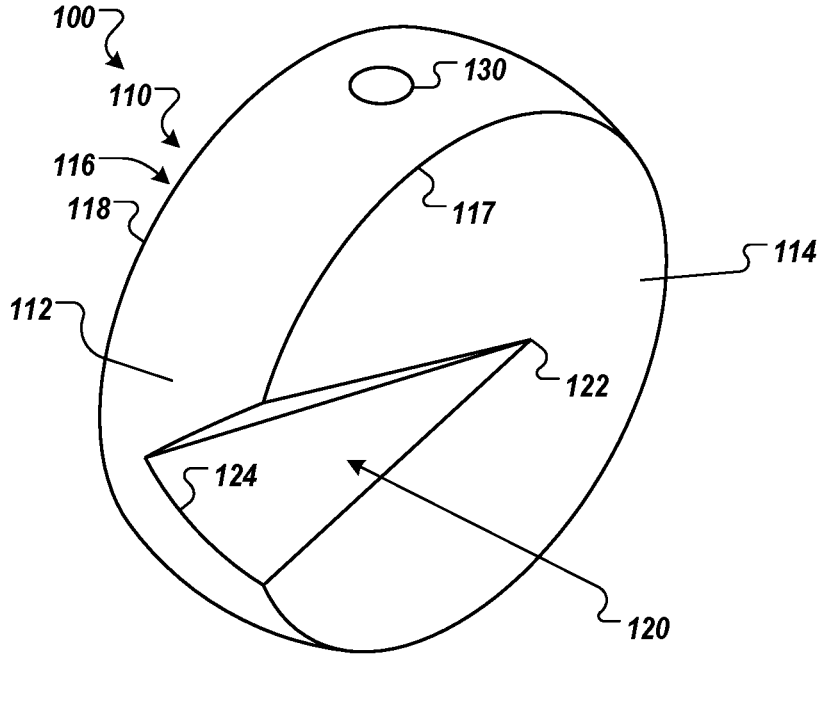
FIG. 1 is a front corner perspective view of an example gate element of a valve apparatus.
Figure 2:
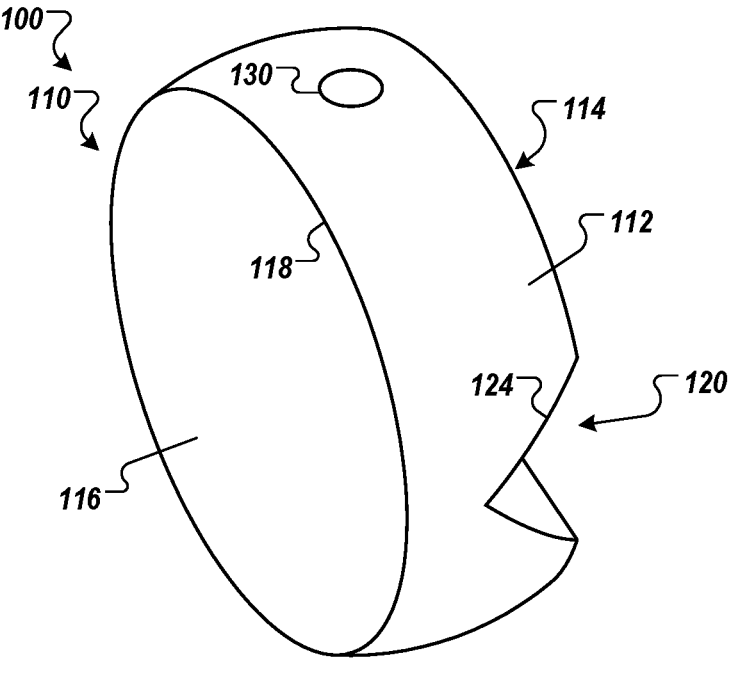
FIG. 2 is a rear corner perspective view of the example gate element of FIG. 1.

FIGS. 1-4 show various views of an example gate element 100 of a valve apparatus. FIG. 1 is a front corner perspective view of the example gate element 100. FIG. 2 is a rear corner perspective view of the example gate element 100. FIG. 3 is a side view of the example gate element 100. FIG. 4 is a front view of the example gate element 100.

The gate element 100 is generally configured as a spherical element 110. As used in this document, the term "spherical segment" describes a solid body defined by cutting a sphere or a ball with a pair of parallel planes. For example, the body can resemble a spherical cap with a truncated top, and corresponds to a spherical frustum. The spherical element 110 has a semispherical or semi-ovoid, peripheral edge 112, with a substantially planar front face 114 and a substantially planar rear face 116. The front face 114 is bounded by a substantially elliptical edge 117 at the semispherical peripheral edge 112, and the rear face 116 is bounded by a substantially elliptical edge 118 at the semispherical peripheral edge 112.

In the illustrated examples, the front face 114 and the rear face 116 are substantially parallel to each other, but in some embodiments the faces may be non-planar and/or non-parallel. In the illustrated example, the front face 114 and the rear face 116 are equidistant from the spherical center of the spherical element 110, but in some embodiments the faces may be arranged at any other appropriate distance from the center and/or each other.

The gate element 100 also includes a channel 120 (e.g., groove, recess) defined in the front face 114. The channel 120 has an end 122 that is arranged proximal to a midpoint of the front face 114, away from the edge 117. The channel 120 has substantially zero depth and zero width at the end 122. The channel 120 has a depth that progressively increases as the channel extends away from the end 122 to an end 124 at the edge 117. At the end 124, the channel 120 defines a notch 126 in the peripheral edge 112.

In the illustrated examples, the channel 120 is defined as a substantially V-shaped, triangular groove that starts near the middle of the front face 114 and becomes deeper and more pronounced as it cuts below the front face 114 into the spherical element 110. In some embodiments, the channel 120 can have any appropriate shape (e.g., cylindrical, conical, U-shaped, rectangular). In some embodiments, the channel 120 can have any appropriate contour or depth along its length, such as a linear, ramp-like contour defined from the front face 114 into the spherical element 110 and opens at the peripheral edge 112, a rounded contour defined from the front face 114 into the spherical element 110, a rectangular contour defined as a shoulder defined from the front face 114 into the spherical element, or any other appropriate shape. In some embodiments, the channel 120 can be defined by any appropriate shape across the front face 114, such as the illustrated v-shape, a u-shape, or any other appropriate curved shape, polygonal shape, or combinations of shapes. An example of a gate element with a U-shaped channel is discussed in more detail in the description of FIGS. 8A-8C.

The gate element 100 also includes an axis 130. As will be discussed in more detail below, the gate element 100 is configured to urge and/or guide pivotable movement about or based on a post that acts as an axle. The channel 120 is arranged substantially across the front face 114 substantially perpendicular to the axis 130.

FIGS. 5A-5D are cross-sectional top views of an example valve apparatus 200 with the example gate element 100 in various opening configurations. FIGS. 6A-6D are perspective views of the valve apparatus 200 with the gate element 100 in various opening configurations.

The example valve apparatus 200 includes a housing 210 (shown in dashed lines to make interior components easier to view for the purposes of this description). The housing 210 has a substantially cylindrical, tubular shape that defines a fluid flow path 510. The housing 210 has an outer wall 212 and an inner wall 214. The inner wall 214 has a diameter that is substantially equal to the diameter of the peripheral edge 112.

Figures 5A, 6A:
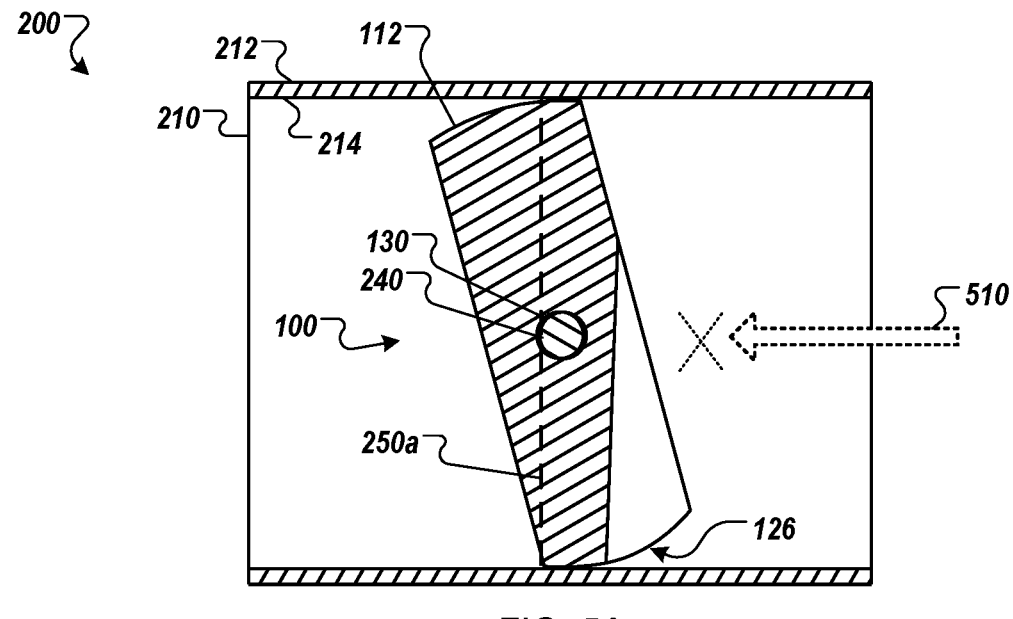
FIGS. 5A-5D are cross-sectional top views of a valve with the gate element in various opening configurations.
FIGS. 6A-6D are perspective views of the valve with the gate element in various opening configurations.

FIGS. 5A and 6A show the example valve apparatus 200 in a substantially closed (e.g., fluid flow blocking) configuration. The gate element 100 is configured to rotate about the axis 130 on a post 240 within the housing 210 to an at least partly blocking configuration in which a circumference of the semispherical peripheral edge 112 is substantially close to, or is in substantially fluidically sealing contact with, the inner wall 214. In the illustrated example, the area of proximity between the peripheral edge 112 and the inner wall 214 is represented by a line 250a.

In the illustrated configuration, the gate element 100 is rotated such that the notch 126 does not intersect the proximal area 250a, and the proximal area 250a forms a substantially continuous circumferential ring of proximity between the gate element 100 and the housing 210 (e.g., about-15 degrees). As such, in the configuration shown in FIGS. 5A and 6A, fluid flow through the valve apparatus 200 is substantially blocked by the gate element 100.

In some embodiments, the inner wall 214 can include a rounded shoulder that is configured to compliment the semispherical peripheral edge 112, such that the proximal area 250a can be in fluidically sealing contact with the inner wall 214. In some embodiments, an elastomer seal (e.g., an o-ring) can be arranged in fluidically sealing contact between the peripheral edge 112 and the inner wall 214 to provide a partial or complete fluidic seal.

Figures 5B, 6B:
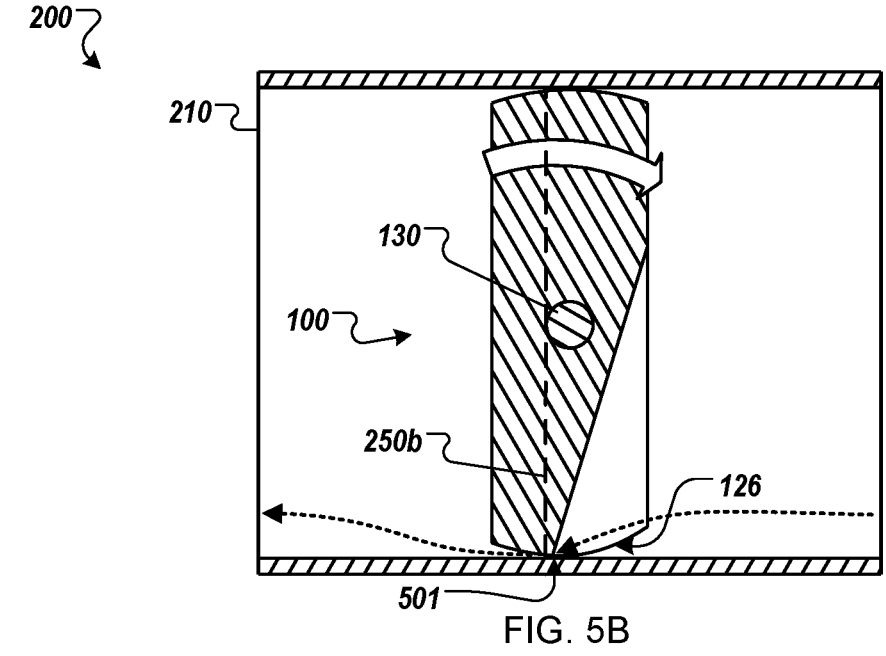

FIGS. 5B and 6B show the example valve apparatus 200 in a mostly closed (e.g., very low flow) configuration. The gate element 100 is rotated about the axis 130 within the housing 210 to a configuration in which a circumference of the semispherical peripheral edge 112 is proximal to, or in substantially fluidically sealing contact with, the inner wall 214, a small section of which is intersected by a tip area 501 of the notch 126, resulting in a proximal area 250b that is slightly smaller than the proximal area 250a (e.g., about zero degree rotation, with the faces 114 and 116 substantially perpendicular to the major axis defined by the housing 210 and a direction of flow defined by the housing 210). As such, in the configuration shown in FIGS. 5B and 6B, a small amount of fluid flow is permitted through the tip area 501.

Figures 5C, 6C:
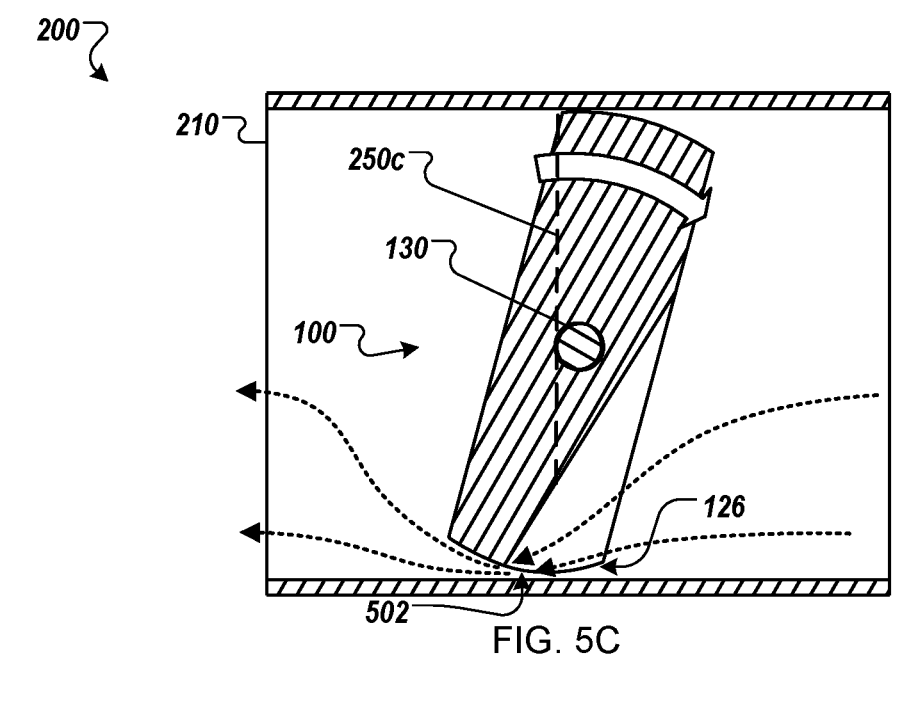

FIGS. 5C and 6C show the example valve apparatus 200 in a partly open (e.g., moderate flow) configuration. As the gate element 100 rotates, the amount of area of the notch 126 that intersects a proximal area 250c can be controllably increased and decreased. In the illustrated example, the gate element 100 is rotated about the axis 130 within the housing 210 to a configuration in which the proximal area 250c of the semispherical peripheral edge 112 is proximal to, or in substantially fluidically sealing contact with, the inner wall 214, apart from a section of which is intersected by a tip area 502 of the notch 126 (e.g., about +15 degrees). The tip area 502 is relatively larger than the example tip area 501, and has a relatively larger flowable area than the tip area 501. As such, in the configuration shown in FIGS. 5C and 6D, a moderate amount of fluid flow is permitted through the tip area 502.

In some implementations, the variable fluid metering provided by the notch 126 can be controlled from substantially zero flow in the example configuration of FIGS. 5A and 6A to a high-metered flow when the gate element 100 is rotated such that the elliptical edge 117 intersects the proximal area 250c. In such ranges of rotation of the gate element 100, the action of the valve apparatus 200 is similar to that of a ball valve. However, the gate element 100 can be rotated further, as will be described next, such that the action of the valve apparatus 200 is similar to that of a butterfly valve.

Figures 5D, 6D:
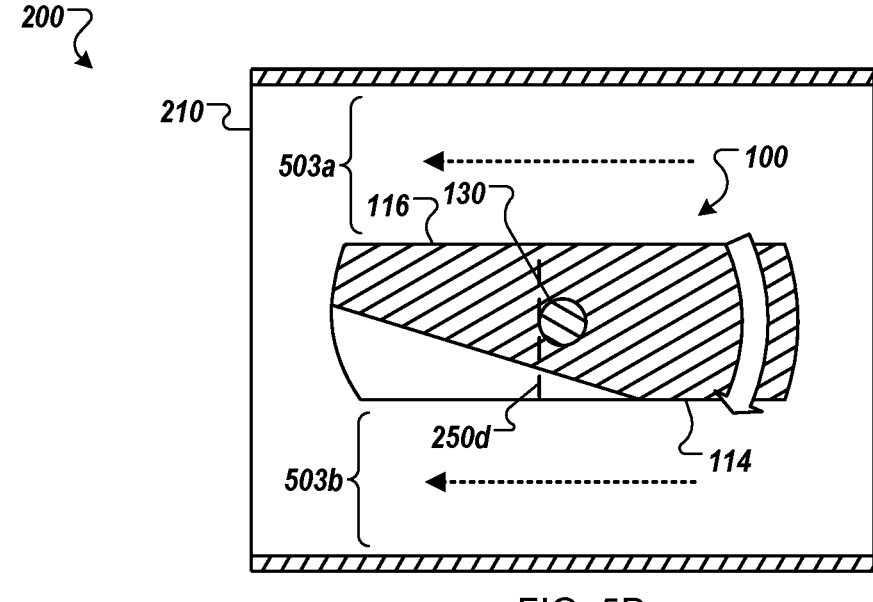

FIGS. 5D and 6D show the example valve apparatus 200 in a substantially fully open (e.g., full flowing) configuration. The gate element 100 is rotated such that the front face 114 and the rear face 116 are substantially parallel to the major axis of the housing 210 and the direction of fluid flow defined by the housing 210. In the illustrated configuration, a flowable area 503a and a flowable area 503b are opened, and the total flowable area of the housing 210 is reduced by substantially only the thickness of the gate element 100 between the front face 114 and the rear face 116, at a proximal area 250d (e.g., about +90 degrees).

FIGS. 5A-5D and FIGS. 6A-6D illustrate the example valve apparatus 200 in various travel positions and degrees of rotational travel of the gate element 100 about the post 240. In FIG. 5A, the rotational angle of travel of the gate element 100 is about −15 degrees. In FIG. 5D, the rotational angle of travel of the gate element 100 is about 90 degrees. Comparing FIG. 5A to FIG. 5D illustrates the total rotational angle of travel of the gate element 100 is about 105 degrees. In one embodiment, an actuator is operably assembled or directly coupled with the valve apparatus 200 with no intermediate linkage. The actuator is configured to rotate the gate element 100 throughout the various positions, greater than 90 degrees, and up to about 105 degrees. As such, the actuator is capable of rotation greater than 90 degrees. Beneficially, no positional error is induced with operation of the directly coupled actuator.

The example valve apparatus 200 is configured to provide a very low leakage, high turn down ratio, and a very gradual flow opening profile. The gradual opening profile can also be described by a flow "gain" curve. Gain can be described as the percent of increase in area for each percentage change in rotary position of the gate element 100 within the housing 210. In general, the lower the gain, the better the valve accuracy will be since positioning error of the valve can be proportional to flow error, and the larger the gain, the more the flow error can be for each percent of positioning error.

The example valve apparatus 200 creates a very gradual flow opening profile by replacing the plate found in typical butterfly valves with a thicker body, adding a notch in the side of it, and extending the butterfly further closed, past a position perpendicular to the bore when in the closed position. By doing this the notch in the side is out of the way, and the closed flow leakage of the throttle is reduced to the typical bore-to-place clearance. In some embodiments, the spherical outside of the gate element 100 can have a close clearance, for example on the order of 0.001" radial clearance, and not collide with the inner wall 214 as the gate element 100 rotates within the housing 210. Compared to existing designs, the geometry of the valve apparatus 200 utilizes a relatively much larger portion of the bore when open than current designs, and as such the bore and ball size can be reduced significantly relative to existing designs in order to achieve a full open flow rate.

FIG. 7 is flow chart that shows an example of a process 700 for controlling flow. In some implementations, the process 700 can be performed by the example valve 200 of FIGS. 5A-5D and 6A-6D.

At 710, a gate element of a flow control valve is actuated to a first configuration in which fluid flow is substantially blocked by the gate element. For example, the valve 200 can be actuated to the example configuration shown in FIGS. 5A and 6A.

The flow control valve also includes a cylindrical housing having an inner wall having a first diameter, and the gate element is formed as a spherical segment. The spherical segment includes a semispherical peripheral edge having a second diameter that is substantially equal to the first diameter, a substantially planar face bounded by a substantially elliptical edge at the semispherical peripheral edge, and a channel defined in the substantially planar face and having a first end proximal to the substantially planar face away from the substantially elliptical edge and extending away from the substantially planar face and partly into the spherical segment to a second end defining a notch in the semispherical peripheral edge. For example, the valve 200 includes the housing 210 and the gate element 100 with the notch 126 in the front face 114.

In some implementations, the channel can have substantially zero depth away from the substantially planar face into the spherical segment at the first end. For example, the channel 120 becomes progressively shallower as it extends away from the peripheral edge 112 to the end 122 where the channel 120 has a zero depth.

In some implementations, the channel can be substantially triangular and substantially v-shaped. For example, the channel 120 is shown as a having a V-shaped cross-sectional profile, and having a triangular shape across the front face 114. In some implementations, the channel can have any appropriate cross sectional and/or overall shape (e.g., U-shaped, conical, rectangular, cylindrical, spherically concave). An example of a gate element with a U-shaped channel is discussed in more detail in the description of FIGS. 8A-8C.

In some implementations, the valve can include a post arranged between the gate element and the housing and configured to guide pivotable movement of the gate within the housing. For example, the gate element 100 can pivot about the post 240. In some implementations, the post can be configured to urge pivotable movement of the gate element. For example, the post 240 can be affixed to an actuator (e.g., motor) or lever that can be moved to cause the gate element 100 to rotate within the housing 210.

At 720, the gate element is actuated to a second configuration in which an aperture is partly defined by the inner wall and the notch. For example, the valve 200 can be actuated to the example configuration shown in FIGS. 5B and 6B or the example configuration shown in FIGS. 5C and 6C.

In some implementations, in the first configuration the gate element can be rotated within the housing such that a circumference of the semispherical peripheral edge is proximal to, or in fluidically sealing contact with, the inner wall. For example, in the example configuration of FIGS. 5A and 6A, the gate element 100 is substantially blocks flow between the inner wall 214 and the proximal area 250*a*.

In some implementations, in the second configuration the gate element can be rotated within the housing such that a circumference of the semispherical peripheral edge is in proximity to the inner wall and is intersected by a portion of the notch. For example, in the example configurations of FIGS. 5A, 6A, 5B, and 6B, the peripheral edge 112 proximal to the inner wall 214 along the proximal areas 250*b* and 250*c*, intersected by the tip areas 502 and 503 through which a limited fluid flow can pass.

In some implementations, in the second configuration the gate element can be rotated within the housing such that the substantially planar face is arranged substantially perpendicular to a fluid flow path defined by the housing. For example, in the example configuration of FIGS. 5B and 6B, the front face 114 is substantially perpendicular to the major axis of the housing 210 and to the fluid flow path 510.

At 730, the gate element is actuated to a third configuration in which the substantially planar face is substantially parallel to a major axis of the cylindrical housing. For example, the valve 200 can be actuated to the example configuration shown in FIGS. 5D and 6D.

Figures 8A, 8B, 8C:
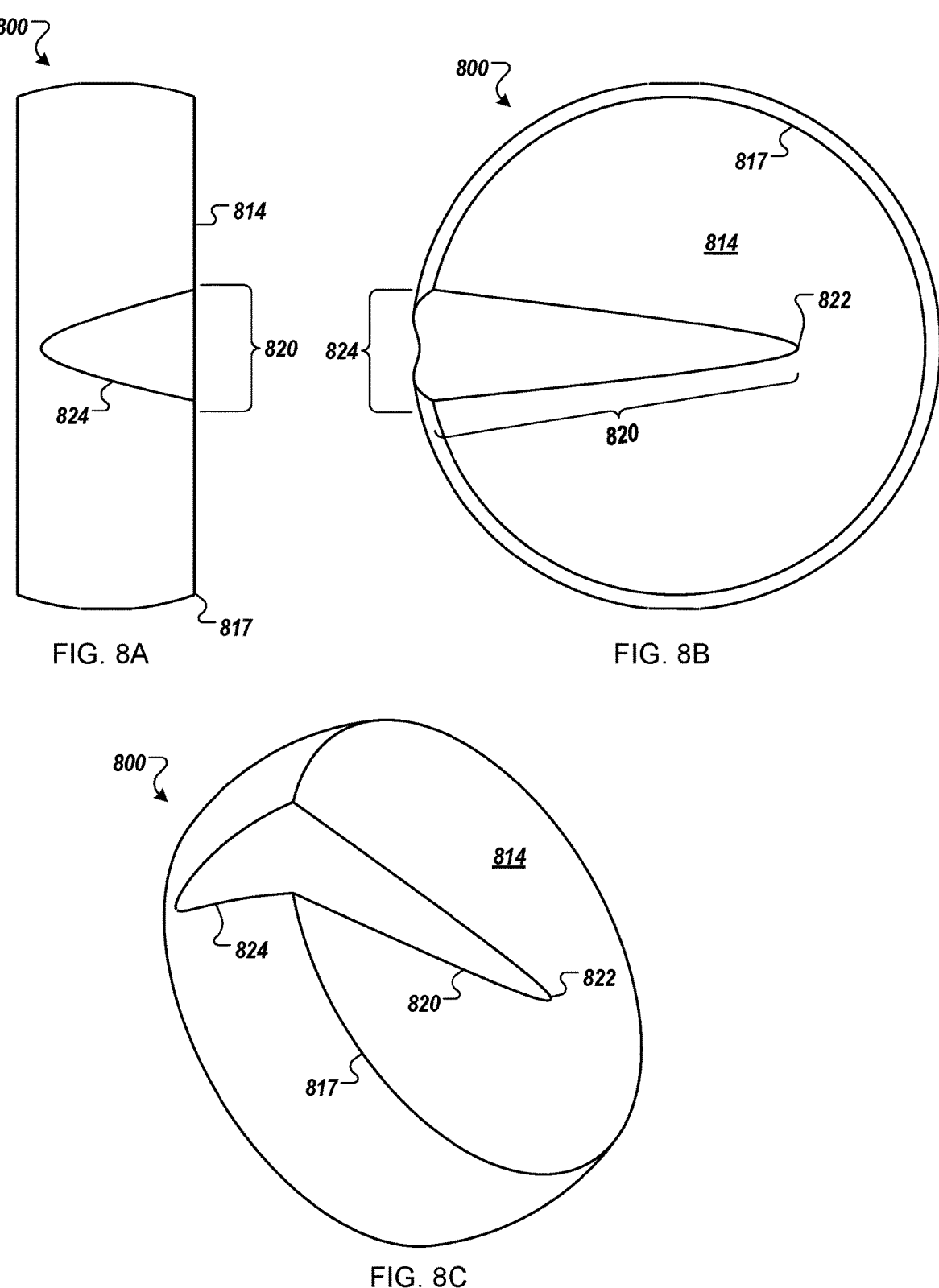
FIGS. 8A-8C are various views of another example gate element.

FIGS. 8A-8C are various views of another example gate element 800. In general, the gate element 800 is substantially similar to the example gate element 100, but instead of including the channel 120, the gate element 800 includes a channel 920 (e.g., groove, recess) defined in the front face 814. The channel 820 is defined as a substantially U-shaped groove. The channel 820 has substantially zero depth and zero width at an end 822. The channel 820 has a depth that progressively increases as the channel extends away from the end 822 to an end 824 at the edge 817.

Figure 9:
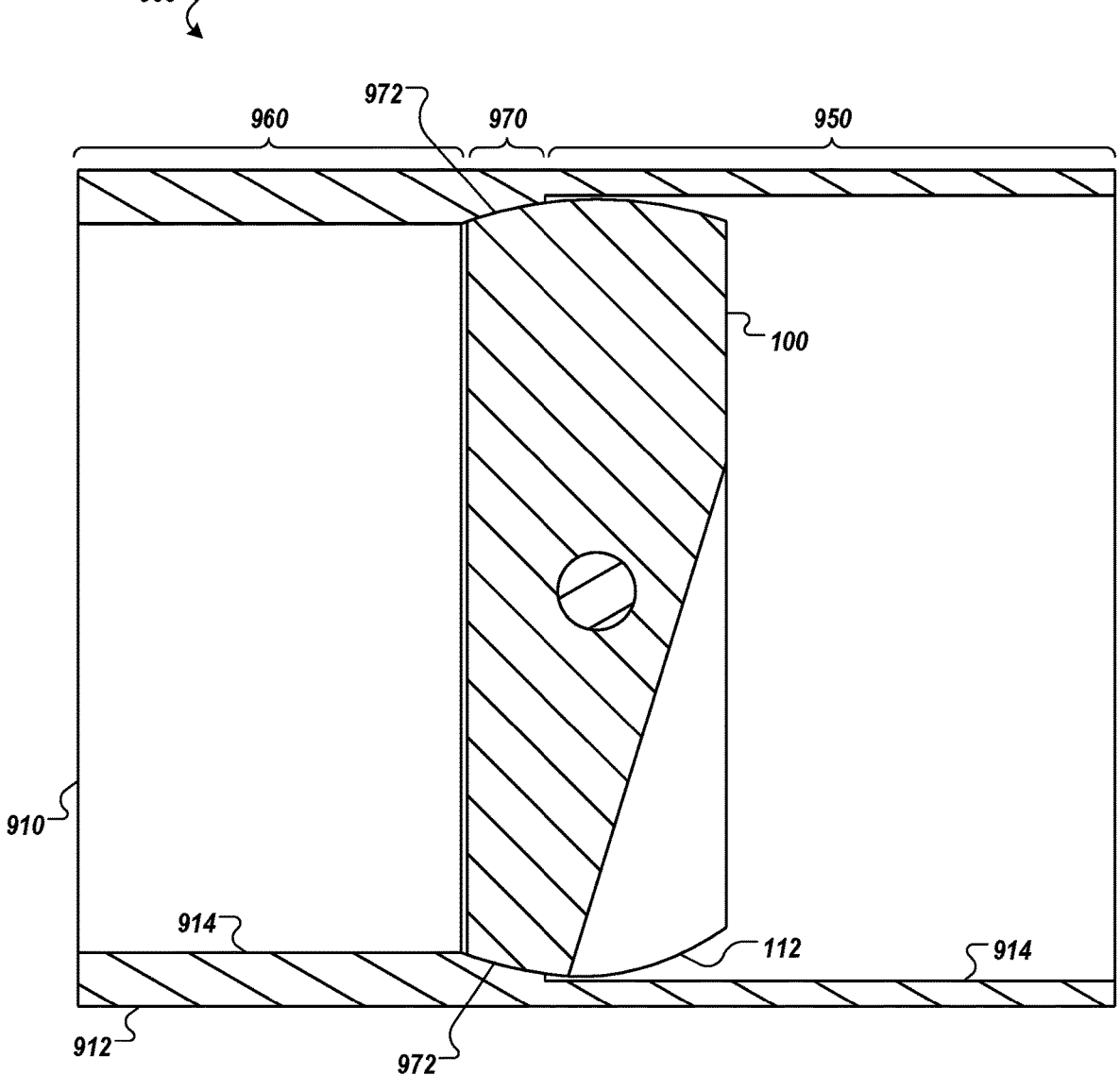
FIG. 9 is a cross-sectional view of another example valve apparatus.

FIG. 9 is a cross-sectional view of another example valve apparatus 900. In general, the valve apparatus 900 is substantially similar to the example valve apparatus 200, including the gate element 100. The example valve apparatus 900 differs from the example valve apparatus 200 in that a housing 910 (shown in dashed lines to make interior components easier to view for the purposes of this description) has an outer wall 912 and an inner wall 914 that defines a substantially cylindrical, tubular shape.

The inner wall 914 has a first portion 950 having a diameter that is substantially equal to the diameter of the peripheral edge 112 and has a second portion 960 having a diameter that is smaller than that of the first portion 960. A third portion 970 defines a concave face 972 extending from the diameter of the first portion 950 to the diameter of the second portion 960.

The concave face 972 is configured with a concavity that is complimentary to the curvature of the peripheral edge 112. In the illustrated example, the peripheral edge 112 is configured to contact the concave face 972. Contact between the peripheral edge 112 and the concave face 972 is configured to provide a partial or complete fluidic seal. In some embodiments, an elastomer seal (e.g., an o-ring) can be arranged in fluidically sealing contact between the peripheral edge 112 and the concave face 972 to provide a partial or complete fluidic seal.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A flow control valve comprising:
a gate element formed as a spherical segment, the gate element includes an axis about which the gate element rotates when assembled with a housing, the gate element comprising:
   a semispherical peripheral edge that spans between a first substantially elliptical edge and a second substantially elliptical edge, wherein the semispherical peripheral edge includes a continuous ring of contact that is positioned between the second substantially elliptical edge and the axis;
   a substantially planar front face bounded by the first substantially elliptical edge at the semispherical peripheral edge;
   a substantially planar rear face bounded by the second substantially elliptical edge at the semispherical peripheral edge; and
   a channel defined in the substantially planar front face and having a first end proximal to a midpoint of the substantially planar front face and extends from the first end to a second end defining a notch in the semispherical peripheral edge; and
a housing having an outer wall and an inner wall, wherein the inner wall defines a tubular shape that receives the gate element therein, the inner wall has a first portion having a first diameter that is substantially equal to a diameter of the semispherical peripheral edge, the inner wall has a second portion having a second diameter that is smaller than the first diameter of the first portion, the inner wall has a third portion that defines a concave face that extends from the first diameter of the first portion to the second diameter of the second portion, wherein the continuous ring of contact of the semispherical peripheral edge of the gate element forms a continuous line of contact with the concave face when the gate element is rotated to a blocking configuration.

2. The flow control valve of claim 1, wherein the gate element is configured to rotate within the housing to a partly blocking configuration in which the circumference of the semispherical peripheral edge is proximal to the inner wall and is intersected by a portion of the notch.

3. The flow control valve of claim 1, wherein the gate element is configured to rotate within the housing to a blocking configuration in which the circumference of the semispherical peripheral edge is proximal to the inner wall such that the continuous ring of contact of the semispherical peripheral edge is in fluidically sealing contact with the concave face.

4. The flow control valve of claim 1, wherein the gate element is configured to rotate within the housing to a flowing configuration in which one of the substantially planar front or rear faces is arranged substantially parallel to a fluid flow path defined by the housing.

5. The flow control valve of claim 1, wherein the housing is cylindrical and defines a major axis, and the gate element is configured to rotate within the housing to a flowing configuration in which one of the substantially planar front or rear faces is arranged substantially parallel to the major axis.

6. The flow control valve of claim 1, wherein the channel has substantially zero depth away from the substantially planar front face into the spherical segment at the first end and has a depth that progressively increases as the channel extends from the first end to a second end.

7. The flow control valve of claim 1, wherein the channel is substantially triangular and substantially v-shaped or u-shaped.

8. The flow control valve of claim 1, further comprising a post arranged between the gate element and the housing and configured to guide pivotable movement of the gate element within the housing.

9. The flow control valve of claim 8, wherein the post is configured to urge pivotable movement of the gate element.

10. The flow control valve of claim 1, further comprising an elastomer seal arranged in fluidically sealing contact between the continuous ring of contact of the semispherical peripheral edge and the concave face.

11. A method of flow control, comprising:

actuating a gate element of a flow control valve to a first configuration in which fluid flow is substantially blocked by the gate element, wherein the gate element includes an axis and the gate element is configured to rotate about the axis when the gate element is actuated, wherein the flow control valve further comprises a cylindrical housing having an inner wall having a rounded shoulder that spans between a first diameter and a second diameter, wherein the rounded shoulder is configured to compliment the semispherical peripheral edge such that a continuous ring of contact of the semispherical peripheral edge is in fluidically sealing contact with the rounded shoulder when the gate element is in the first configuration, and the gate element is formed as a spherical segment comprising:

a semispherical peripheral edge that spans between a first substantially elliptical edge and a second substantially elliptical edge, wherein the semispherical peripheral edge includes the continuous ring of contact that is positioned between the second substantially elliptical edge and the axis;

a substantially planar front face bounded by the first substantially elliptical edge at the semispherical peripheral edge;

a substantially planar rear face bounded by the second substantially elliptical edge at the semispherical peripheral edge; and a channel defined in the substantially planar front face and having a first end proximal to the substantially planar front face away from the first substantially elliptical edge and extending away from the substantially planar front face and partly into the spherical segment to a second end defining a notch in the semispherical peripheral edge; and actuating the gate element to a second configuration in which an aperture is partly defined by the inner wall and the notch.

12. The method of claim 11, wherein in the second configuration the gate element is rotated within the housing such that a circumference of the semispherical peripheral edge is proximal to the inner wall and is intersected by a portion of the notch.

13. The method of claim 11, wherein the channel has substantially zero depth away from the substantially planar front face into the spherical segment at the first end and has a depth that progressively increases as the channel extends from the first end to a second end.

14. The method of claim 11, wherein the channel is substantially triangular and substantially v-shaped or u-shaped.

15. The method of claim 11, wherein the gate element further comprises a post arranged between the gate element and the housing and configured to guide pivotable movement of the gate within the housing.

16. The method of claim 15, wherein the post is configured to urge pivotable movement of the gate element.

17. The method of claim 11, wherein the actuating the gate element from the first configuration to the third configuration includes rotating the gate element about 105 degrees.

18. The method of claim 11, further comprising an elastomer seal arranged in fluidically sealing contact between the continuous ring of contact of the semispherical peripheral edge and the rounded shoulder.

19. The method of claim 11, further comprising actuating the gate element to a third configuration in which the substantially planar front face is substantially parallel to a major axis of the cylindrical housing, wherein actuating the gate element from the first configuration to the third configuration includes rotating the gate element about 90 degrees.

\* \* \* \* \*